…

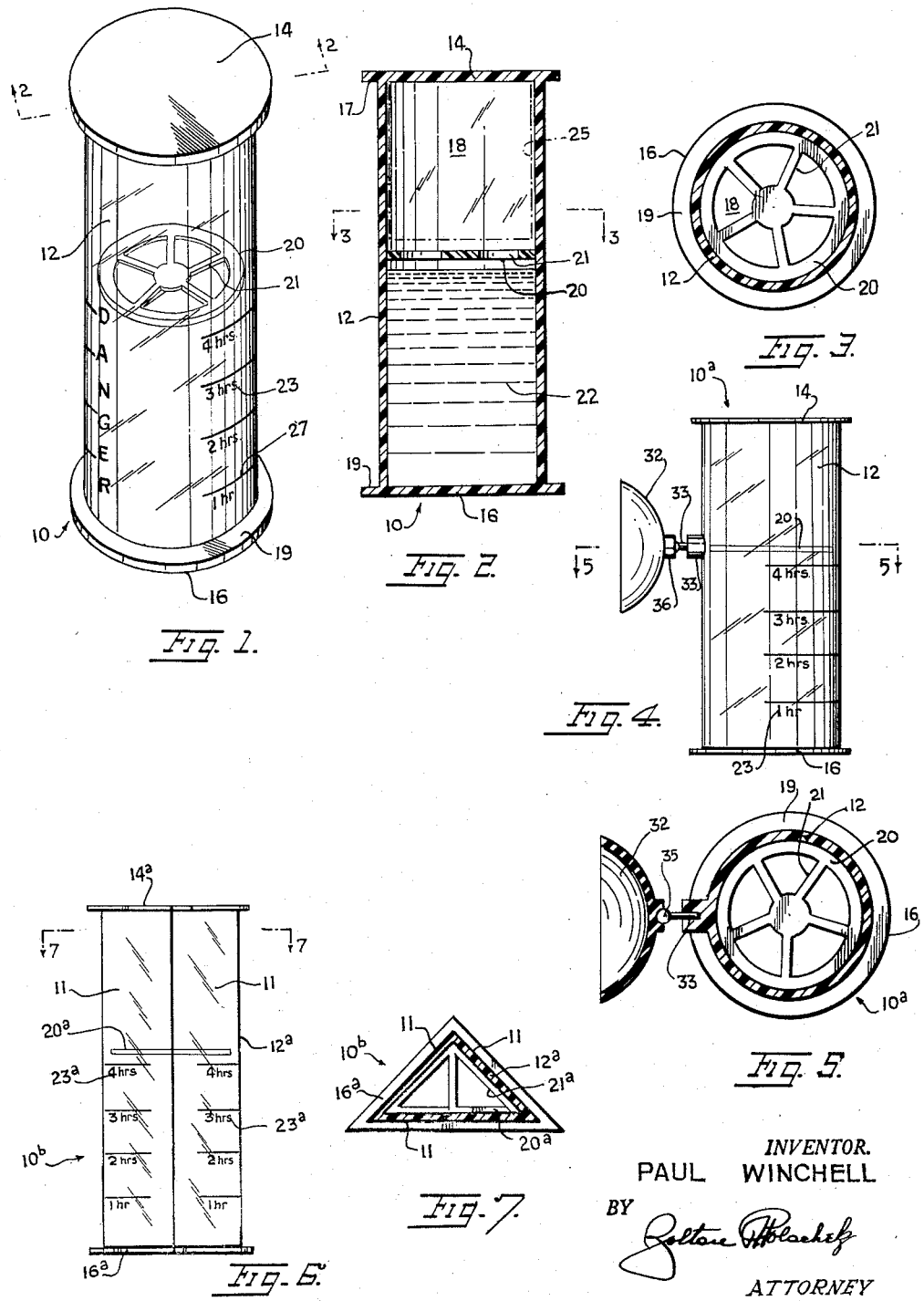

United States Patent Office

3,063,235
Patented Nov. 13, 1962

3,063,235
WARNING INDICATOR FOR INTERRUPTED POWER SUPPLY FOR FREEZERS
Paul Winchell, 9—05 166th St., Whitestone, N.Y.
Filed Feb. 3, 1961, Ser. No. 86,888
1 Claim. (Cl. 58—144)

This invention concerns an improved warning device for indicating the occurrence of a temporary defrosted condition of a freezer.

According to the invention there is provided a transparent container of water or other liquid in which is transversely disposed a spider or screen member. The device may be inserted in a freezer in an inverted position so that the water or other liquid freezes to ice and is then located at one end of the container. The device will then be turned right side up. If the refrigeration unit which keeps the freezer at sub-zero temperature should become temporarily inactive due to interruption of its power supply or for other reasons, the ice in the container will slowly melt and the water or other liquid will drain through the screen to the empty lower portion of the container. The quantity of water or other liquid in the container will be a measure of the length of time that the food has been defrosting.

It is therefore one object of the invention to provide a transparent container of water with a strainer member located therein to permit the water to drain through.

A further object is to provide a device of the character described formed of any transparent material and with a scale thereon calibrated to indicate defrosting times of the frozen foods or other frozen products, such as medicines, frozen blood plasma, etc.

A still further object is to provide an indicator device as described with means for rotatably mounting the indicator inside a freezer.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

FIG. 1 is a perspective view of a device embodying the invention.

FIG. 2 is a vertical sectional view taken on line 2—2 of FIG. 1.

FIG. 3 is a cross-sectional view taken on line 3—3 of FIG. 2.

FIG. 4 is an elevational view on a reduced scale of another device according to the invention.

FIG. 5 is a cross-sectional view on the same scale as that of FIG. 3, taken on line 5—5 of FIG. 4.

FIG. 6 is an elevational view of another device embodying the invention.

FIG. 7 is a similar view to FIG. 3, but showing another form of the invention.

Referring to FIGS. 1–3, there is shown a cylindrical container 10 having a hollow body 12 with closed end walls 14, 16. In the cylindrical cavity 18 of the container is secured a spider ring 20. This ring may be a plastic member cemented or fused to the interior of the body 12 or otherwise made integral with the said body. The body 12 is formed of transparent material, preferably a plastic such as an acrylic. The container is slightly less than half full of water or other liquid 22. The ring 20 is disposed centrally of the container body and transversely thereacross. The ring has openings 21 between its arms through which the water can drain from one end of the container to the other. Marked or etched on the outside of the container body is a scale 23 indicative of various water levels from the bottom end 16. The ends of the container may be formed with annular flanges 17, 19 to stabilize the container and prevent tipping over.

In use of the device, it will be disposed in a freezer of food or other articles. The device will then be inverted, axially vertical with the end 14 at the bottom. The water will freeze in the bottom of the container body to form a block of ice in cylindrical form. The cylinder of ice is indicated by dotted lines in FIG. 2 at 25. The device will then be inverted to the position of FIGS. 1 and 2 so that the ice block is located above spider member 20 which may support the ice block. This spider member 20 may be an integral part within one portion of the body 12. If the temperature in the freezer in which the device is placed should increase to the level where foods or other products begin to thaw, the ice block 25 will melt partially or wholly. As the ice block melts, the water therefrom will drain down through the openings in the ring 20 to the bottom of the container. The level to which the water rises will be determined by the length of time that the ice block thaws. This length of time will be measured by the calibrated scale 23, whose lines 27 have accompanying indicia showing one, two, three and four hours, etc. of defrosting time. The water draining down in the container may refreeze, but by its presence it serves as a warning that the freezer and its contents have temporarily been defrosted.

In FIGS. 4 and 5, is shown another form of the invention in which container 10ᵃ has a boss 30 formed on its outer side. A suction cup 32 is attached to the container by a pin 33 having a ball head 35 engaged in knob 36 of the suction cup. The container is rotatably supported by the suction cup which can be attached to a door or wall of a freezer wherever convenient. The suction cup permits the container to be inverted and turned in a vertical plane to its successive positions required for proper use of the device as described above, while the cup 32 is axially horizontal and attached to a vertical support.

In FIGS. 6 and 7 is shown another device 10ᵇ embodying the invention, similar in structure to devices 10 and 10ᵃ, except that the transparent body 12ᵃ of the device is triangular in cross section. A scale 23ᵃ is marked on each flat wall 11 of the container body. Screen 20ᵃ is triangular in form and has triangular openings 21ᵃ for draining water therethrough. End walls 14ᵃ, 16ᵃ are also triangular.

The several containers can be fabricated with one open end. After insertion of the drain ring or screen and filling with water, the open end can be closed by cementing or fusing an end wall over the open end of the container.

It is to be understood that the transparent body 12 of the device may be made of any suitable material of various sizes and shapes and of any desired color combination.

While I have illustrated and described the preferred embodiments of my invention, it is to be understood that I do not limit myself to the precise constructions herein disclosed and that various changes and modifications may be made within the scope of the invention as defined in the appended claim.

Having thus described my invention, what I claim as new, and desire to secure by United States Letters Patent is:

A device for indicating the occurrence of a temporary defrosted condition of a freezer, comprising in combination, a container having a transparent elongated hollow body with closed ends, a screen secured inside said body extending thereacross at a position intermediate the ends of the container, and a quantity of water in the container, said quantity being less than half the volume of the interior of said body, a scale on the exterior of said body corresponding to various water levels therein and calibrated to indicate the length of time said water flows through said screen from one end of the container to the other, after the water is once frozen to ice in the one end of the container and the ice thereafter thaws temporarily, and a suction cup secured to said body by swivel means so that the body is rotatable in a plane perpendicular to the axis of said cup, said body being cylindrical in form, said screen being in the form of a spider ring.

References Cited in the file of this patent

UNITED STATES PATENTS 2,847,067    Brewer _____ Aug. 12, 1958